May 30, 1967 G. L. HELLSTROM 3,322,372
CABLE WINDING DEVICE
Filed April 12, 1965

INVENTOR
Gösta Ludvig Hellstrom
BY
ATTORNEY ively urged to rotate relative to drum 11 in the direction for winding the cable 14 on barrel portion 15 by means of a spiral spring 26 having its opposite ends suitably secured to drum 11 and to control member 12 and being preferably received in a recess 27 formed in the surface of annular wall 21 of the control member facing toward wall 18 of drum 11.

United States Patent Office 3,322,372
Patented May 30, 1967

3,322,372
CABLE WINDING DEVICE
Gösta Ludvig Hellström, Stockholm, Sweden, assignor to Aktiebolaget Electrolux, Stockholm, Sweden, a corporation of Sweden
Filed Apr. 12, 1965, Ser. No. 447,332
6 Claims. (Cl. 242—107)

This invention relates generally to a cable winding device of the type having a fixed drum with cable guiding means movable relative thereto along a circular path which is concentric with the drum to wind a cable on the latter upon movement of the guiding means in one direction along the path and to move in the opposite direction when a pull is exerted on the free end of the cable for unwinding the latter from the drum. The foregoing type of cable winding device is advantageous in that, when the cable is intended to supply electricity to a motor or other electrically powered unit, from an electrical outlet or receptacle engaged by a plug at the free end of the cable, the fact that the drum is non-rotatable makes it possible to directly connect the conductors at the other end of the cable with the motor or the like and thereby eliminates the necessity of providing the slip rings and brushes or the like which are required in the electrical circuit in those cases where the winding device includes a rotated drum.

Known cable winding devices of the type having a fixed drum, as described above, are constructed and arranged in such a manner as to have relatively large axial dimensions so that such known cable winding devices are not suitable for mounting within vacuum cleaners or other electrically powered machines that are intended to be portable and thus must have compact configurations.

Accordingly, it is an object of this invention to provide cable winding devices of the type having a fixed or non-rotatable drum, and which are compact, particularly in the direction of the axis of the drum so as to be suitable for mounting in vacuum cleaners or other machines which, of necessity, afford a limited space for accommodating the cable winding device.

A further object is to provide cable winding devices of the described character which are simple and trouble-free in operation, and wherein a pull exerted in any direction on the free end portion of the cable extending from the outlet of the cable winding device will be effective to cause unwinding of the cable from the drum.

In accordance with an important aspect of this invention, a cable winding device of the type having a fixed drum with cable guiding means movable along a circular path concentric with the drum to wind a cable on the latter upon movement of the guiding means in one direction along such path, is provided with an opening extending axially through the drum at the center of the latter to constitute the outlet of the cable winding device through which the cable passes after engagement with the cable guiding means.

In preferred embodiments of this invention, the cable guiding means, which may be in the form of a plurality of rollers or other friction reducing elements engaging the cable, are mounted adjacent the periphery of an annular winding control member having a tubular, central hub rotatably mounted in the central opening of the drum so that the run of the cable between the guiding means and the central opening of the drum constituting the outlet of the device passes smoothly over the annular winding control member and through the tubular hub of the latter.

The above and other objects, features and advantages of the invention, will be apparent in the following detailed description of illustrative embodiments thereof which is to be read in connection with the accompanying drawing, wherein.

Figure 1:
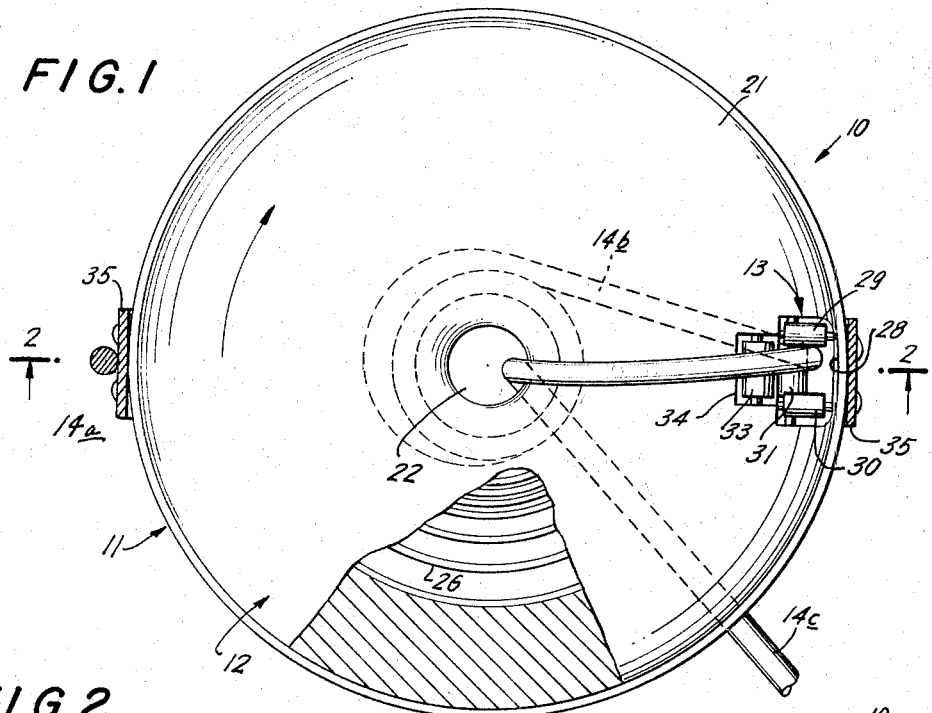
FIG. 1 is an elevational view, partly broken away and in section, of a cable winding device in accordance with one embodiment of this invention.
Figure 2:
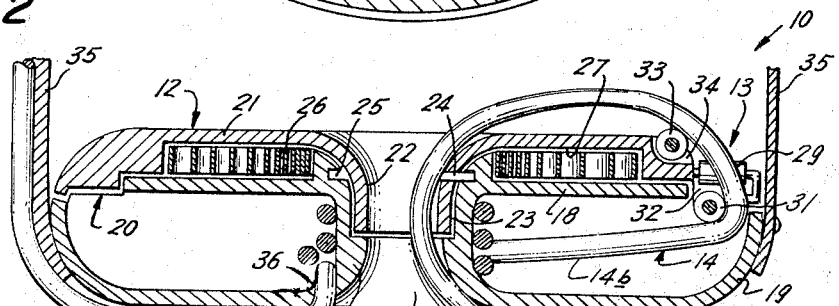
FIG. 2 is a sectional view taken along the line 2—2 on FIG. 1.

Referring to the drawing in detail, and initially to FIGS. 1 and 2 thereof, it will be seen that a cable winding device embodying this invention and there generally identified by the reference numeral 10 comprises a fixed drum 11, a windinng control member 12 which is rotatable relative to the fixed drum and carries cable guiding means 13, and a cable or electric cord 14 which is intended to be more or less wound on the drum 11.

In accordance with this invention, the drum 11 which has a barrel portion 15 (FIG. 2) to receive the wound cable is provided with a central opening 16 extending axially through the barrel portion 15 and constituting the outlet for the cable 14 from the winding device. The drum 11 further has substantially radially directed walls 17 and 18 extending outwardly from the ends of barrel portion 15 to contain the cable wound thereon, and the outer peripheral portion of wall 17 is turned axially toward the other wall 18, as at 19 so as to define an annular slot 20 between the outer peripheral edges of walls 17 and 18 (FIG. 2).

The winging control member 12 includes an annular wall 21 extending over the wall 18 of drum 11 and having its outer periphery closely adjacent to the outer peripheral edge of wall 17. The annular wall 21 merges, near the center of control member 12, into a generally tubular, central hub 22 which is rotatably seated in a counterbored extension 23 of the central opening 16 of drum 11 so as to mount the control member 12 for rotation relative to drum 11 about the axis of the opening 16 of the latter. Control member 12 and drum 11 are held in assembled relation by means of one or more pins 24 projecting radially outward from hub 22 and slidably engaging in an annular, radially inward opening groove 25 formed in the inner surface of barrel 15 adjacent the outer end of counterbore 23.

It will now be evident that the space between the walls 17 and 18 of the drum 11 extends radially a major portion of the distance between the axis of the barrel 15, which may be referred to as a first hollow member, and the periphery of the wall 18 which may be referred to as a first wall. The hub 22 of the control member 12, which may be referred to as a second hollow member, is perpendicular to and extends from a central opening in the control member. The first and second hollow members 15 and 22, respectively, telescopically fit one within the other. The groove 25 and one or more pins 24 extending therein function to prevent relative axial movement of the first and second hollow members 15 and 22 while permitting rotating movement of the plate-like control member 12 with respect to the drum 11.

In the illustrated embodiment of the invention, control member 12 is yieldably urged to rotate relative to drum 11 in the direction for winding the cable 14 on barrel portion 15 by means of a spiral spring 26 having its opposite ends suitably secured to drum 11 and to control member 12 and being preferably received in a recess 27 formed in the surface of annular wall 21 of the control member facing toward wall 18 of drum 11.

The second wall 17 of the drum 11 and the plate-like control member 12 are at opposite sides of the first wall 18 of the drum. The spiral spring 26 is disposed in a radially extending gap formed between the first wall 18 of the drum 11 and the plate-like control member 12. Further, the plate-like control member 12 extends between the second hollow member 22 and the periphery of the first wall 18 and forms a protective cover for the drum 11 and the cable 14 wound thereon.

The annular wall 21 of winding control member 12 has an aperture 28 adjacent its outer periphery so as to register with the slot 20 of drum 11, and the elements of the cable guiding means 13, which are hereinafter described in detail, are mounted adjacent the aperture 28 for engagement with the cable 14 as the latter passes through such aperture.

In the embodiment of the invention shown on FIGS. 1 and 2, the cable guiding means 13 includes a pair of spaced apart, substantially parallel rollers 29 and 30 rotatably mounted adjacent the opposite sides of aperture 28 and having their axes extending substantially parallel to a radial plane extending from the axis of rotation of control member 12 through the center of aperture 28. The guiding means 13 further includes a roller 31 extending at right angles to the rollers 29 and 30 and being rotatably supported, at its opposite ends, by ears 32 which project from control member 12 at the opposite sides of aperture 28 and extend into slot 20 of drum 11 so as to support roller 11 substantially within the drum. Finally, the guiding means 13 of FIGS. 1 and 2 includes a roller 33 extending parallel to the roller 31, but being rotatably mounted on control member 12, for example, in a recess 34, adjacent the radially inner edge of aperture 28 at the side of annular wall 21 facing away from drum 11.

The drum 11 of cable winding device 10 is fixedly mounted, for example, by straps or brackets 35 which are riveted or otherwise secured to the outer peripheral portion 19 of drum wall 17 and which may extend from the casing of an electric motor (not shown) or other electrically powered unit with which the cable winding device is to be associated. One end portion 14a of the cable 14 which is suitably secured to the terminals of the electric motor or other electrically powered unit extends into the drum 11 through a hole 36 (FIG. 2) formed in wall 17 immediately adjacent barrel portion 15 around which the cable is to be wound. The cable 14 extends in a generally radially outward direction from barrel portion 15 to guiding means 13 where the cable passes around roller 31, between rollers 29 and 30, and finally over roller 33 before extending radially inward over wall 21 of the winding control member to and axially through the hollow hub 22 and the opening 16 at the center of the drum.

Since the run 14b of the cable which extends from barrel portion 15 outwardly to guiding means 13 is spaced, at the point of its tangential engagement with barrel portion 15, from the axis of rotation of control member 12, as is clearly apparent on FIG. 1, a pull exerted on the free end portion 14c of the cable extending from the central opening or outlet 16 and causing tension in the run 14b will give rise to a component of force which effects rotation of control member 12 in the counter-clockwise direction, as viewed on FIG. 1, that is, in the direction for unwinding the cable from barrel portion 15 of the drum. However, when the pull on the free end portion 14c of the cable is relaxed, the spring 26 is effective to rotate control member 12 in the clockwise direction, that is, in the direction of the arrow on FIG. 1, thereby to wind the cable on barrel portion 15 and correspondingly shorten the length of the free end portion of the cable extending from the opening or outlet 16 of the drum. If desired, a suitable locking device (not shown) may be provided for holding control member 12 against rotation by spring 26 after the pull on the free end portion of the cable has been relaxed, thereby to hold the free end portion of the cable in its fully or partly drawn out position until such time as the locking device is released to permit winding of the cable on the drum.

Figure 3:
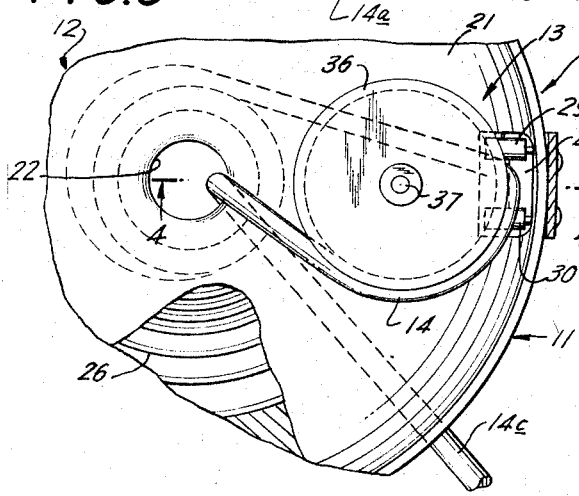
FIG. 3 is a fragmentary elevational view corresponding to a portion of FIG. 1, but showing another embodiment of this invention.
Figure 4:
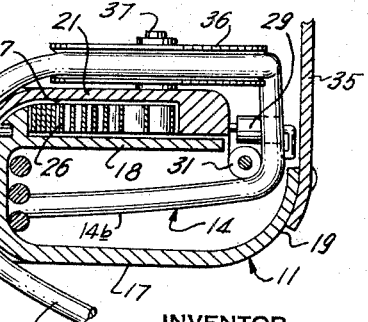
FIG. 4 is a sectional view taken along the line 4—4 on FIG. 3.

Referring now to FIGS. 3 and 4, it will be seen that the cable winding device 10a there illustrated is similar to the device 10 described above and that its several parts are identified by the same reference numerals as the corresponding parts in the device 10. The cable winding device 10A differs from the device 10 only in that the roller 33 of the cable guiding means 13 is replaced by a relatively large diameter pulley 36 which is freely rotatable on a stub shaft 37 carried by the wall 21 of control member 12. The stub shaft 37 extends parallel to the axis of rotation of control member 12 so that pulley 36 lies substantially flat against wall 21, and stub shaft 37 is located with its axis lying substantially in the radial plane extending from the axis of rotation of control member 12 through the center of aperture 28. The radial position of shaft 37 relative to the axis of rotation of control member 12 is selected so that the periphery of pulley 36, at the side of the latter which is remote from the axis of rotation of control member 12, extends above aperture 28. As shown, cable 14, after passing out of drum 11 through aperture 28 between rollers 29 and 30, engages the periphery of pulley 36 in passing over control member 12 to the tubular hub 22 and opening 16, thereby to achieve a relatively greater bending radius of the cable.

It will be apparent that, in both of the described embodiments of this invention, the free end portion 14c of the cable extending from the opening or outlet 16 at the center of the drum, can be pulled in any direction, that is, either in the axial direction away from the drum or at substantial angles to such axial direction, and that such pull will, in all cases, effect smooth unwinding of the cable from the barrel portion of the drum. Further, the foregoing functioning of the cable winding device is achieved with a structure of relatively small axial extent so that the cable winding device embodying this invention may be conveniently installed in a vacuum cleaner or other electrically powered machine which is intended to be portable and thus affords a limited space for accommodating the cable winding device.

Although illustrative embodiments of this invention have been described in detail herein with reference to the accompanying drawing, it is to be understood that the invention is not limited to such precise embodiments, and that various changes and modifications may be effected therein by one skilled in the art without departing from the scope or spirit of the invention as defined in the appended claims.

What is claimed is:

1. A cable winding device comprising a fixed drum including a barrel portion and having a central opening extending axially through said barrel portion, an annular winding control member having a tubular, central hub rotatably mounted in said central opening of the drum, said control member being yieldably urged to rotate in one direction relative to said drum about the axis of said opening and carrying cable guiding means spaced radially outward from said barrel, a cable extending outwardly from said barrel into engagement with said guiding means and, from the latter, inwardly over said annular control member to and axially through said hollow hub and said opening of the drum so that rotation of said control member in said one direction causes winding of the cable on said barrel and a pull exerted on the cable passing through said opening causes rotation of said control member in the opposite direction for unwinding the cable from said barrel, said drum having substantially radially directed walls extending outward from the ends of said barrel portion to contain the cable wound on the latter and the outer periphery of one of said walls being turned toward the other of said walls to define an annular slot around the periphery of said other wall, said annular control member extending over said other wall and having its outer periphery closely adjacent to said outer periphery of said one wall, said control member further having an aperture adjacent its outer periphery to register with said annular slot, and said guiding means being mounted adjacent said aperture to engage the cable passing therethrough.

2. A cable winding device as in claim 1;
wherein said guiding means includes a pair of parallel rollers at the opposite sides of said aperture, at least one additional roller extending at right angles to said pair of rollers, and mounting means for said additional roller extending from said control member into said slot.

3. A cable winding device as in claim 2;
wherein said guiding means further includes a relatively large diameter pulley mounted on said annular control member at the side of the latter facing away from said other wall to engage the cable between said aperture and said hollow hub.

4. A cable winding device as in claim 3;
wherein said pulley is rotatable about an axis parallel to said axis of rotaiton of the control member.

5. A cable winding device as in claim 1;
further comprising a spiral spring disposed between said annular control member and said other wall of the drum and having its ends connected to said drum and control member, respectively, so as to effect the yieldable urging of the drum in said one direction of rotation.

6. A cable winding device comprising
(a) a drum including a first hollow member and first and second walls of annular form which extend radially outward therefrom and define a space therebetween,
(b) a cable in the space which is wound about said first hollow member, said space extending radially a major portion of the distance between the axis of said first hollow member and the periphery of said first wall,
(c) a winding control member of plate-like form having a central opening and a second hollow member which is perpendicular thereto and projects axially therefrom at the opening,
(d) said first and second hollow members telescopically fitting one within the other,
(e) means preventing relative axial movement of said first and second hollow members with respect to one another while permitting rotating movement of said plate-like control member with respect to said drum,
(f) said first and second hollow members defining a central passage through the device,
(g) said second wall of said drum and said plate-like control member being at opposite sides of said first wall of said drum, said plate-like control member and said first wall of said drum having a radially extending gap therebetween,
(h) structure comprising resilient means in said gap for resiliently urging said plate-like control member to rotate in one direction with respect to said drum,
(i) said plate-like control member extending radially between said second hollow member and the periphery of said first wall and forming a protective cover for said drum and said cable wound thereon, and
(j) cable guiding means which is radially removed from said second hollow member and fixed to said plate-like control member at the periphery thereof,
(k) said cable extending radially outward from said space between said first and second walls into engagement with said guiding means and radially inward from the latter to and through said central passage and emerging therefrom at said second wall, so that rotation of said plate-like control member in said one direction with respect to said drum by said resilient means winds said cable on said drum thereon between said first and second walls thereof and a pull exerted on said cable emerging from said central passage at said second wall of said drum effects rotation of said plate-like control member in the opposite direction with respect to said drum to unwind said cable from said drum.

References Cited
UNITED STATES PATENTS

| | | | |
|---|---|---|---|
| 1,587,437 | 6/1926 | Sturge | 242—107 |
| 2,506,583 | 5/1950 | Duerr | 242—107 |
| 2,605,060 | 7/1952 | Bell | 242—128 |
| 2,613,882 | 10/1952 | Small | 242—84 |
| 2,723,809 | 11/1955 | Vanderspek et al. | 242—128 |
| 3,020,567 | 2/1962 | Colt | 242—107 X |
| 3,228,625 | 1/1966 | Blue | 242—82 |

FRANK J. COHEN, *Primary Examiner.*

W. S. BURDEN, *Assistant Examiner.*